United States Patent
Sugiura et al.

[19]

[11] Patent Number: 6,052,016
[45] Date of Patent: Apr. 18, 2000

[54] CHARGE AND DISCHARGE CONTROL CIRCUIT

[75] Inventors: Kazunari Sugiura; Hiroshi Mukainakano; Masanao Hamaguchi; Takayuki Takahashi, all of Chiba, Japan

[73] Assignee: Seiko Instruments Inc., Japan

[21] Appl. No.: 09/018,074

[22] Filed: Feb. 3, 1998

[30] Foreign Application Priority Data

Feb. 4, 1997 [JP] Japan ..................................... 9-021675

[51] Int. Cl.[7] .............................................. H03K 17/296
[52] U.S. Cl. ................................................................ 327/393
[58] Field of Search ................................. 327/52, 54, 56, 327/60, 63–65, 67–69, 72–74, 77–80, 82, 83, 89, 90, 378, 392, 393, 512, 513; 361/89, 90, 91

[56] References Cited

U.S. PATENT DOCUMENTS

| | | | |
|---|---|---|---|
| 4,142,118 | 2/1979 | Guritz ......................................... | 327/72 |
| 4,263,520 | 4/1981 | Kajihata et al. ............................ | 327/94 |
| 4,694,200 | 9/1987 | Hetyei ........................................ | 327/72 |
| 5,446,404 | 8/1995 | Badyal et al. ............................ | 327/143 |
| 5,654,664 | 8/1997 | Park et al. ................................. | 327/531 |
| 5,686,855 | 11/1997 | Lee ............................................ | 327/378 |

*Primary Examiner*—My-Trang Nu Ton
*Attorney, Agent, or Firm*—Adams & Wilks

[57] ABSTRACT

A plurality of combinations of overcurrent detection voltages and delay times are set in a charge and discharge control circuit. Accordingly, a charge and discharge control circuit is formed in which an overcurrent condition having unexpectedly large consumption current, such as a short circuit, does not damage the circuit. In one embodiment, the charge and discharge control circuit comprises a pair of external connection terminals connected to a secondary cell, a switch circuit connected between the cell and at least one of the external connection terminals, an overcurrent detection element connected in series with the power source for producing an output voltage in accordance with a current flowing therethrough, a voltage detecting circuit for determining whether the output voltage of the overcurrent detection element is above one of a plurality of overcurrent detection voltage levels and outputting an overcurrent detection signal for controlling the switch circuit to disconnect the power source from the external connection terminal, and a delay circuit for delaying the overcurrent detection signal by a delay time which depends upon the level of the output voltage of the overcurrent detection element.

17 Claims, 10 Drawing Sheets

CHARGE AND DISCHARGE CONTROL CIRCUIT

BACKGROUND OF THE INVENTION

The invention relates to a charge and discharge control circuit for controlling the charge and discharge of a secondary cell, and to a chargeable power supply device using the charge and discharge control circuit.

A chargeable power supply device has been disclosed, as shown in a circuit block diagram of FIG. 2. In FIG. 2, a secondary cell 201 is connected to an external terminal −V0 or +V0 through a switch circuit 203 and current sensing resistance 204. A switch control circuit 202 and an overcurrent detecting circuit 205 are connected in parallel to the secondary cell 201.

The switch control circuit 202 has a function to detect the voltage of the secondary cell 201, and a signal generates from the switch control circuit 202 so as to turn the switch circuit off at either of an overcharge state and an overdischarge state of the secondary cell 201. A comparator 212 monitors the voltage of the current sensing resistance 204 and compares it with the reference voltage of the reference voltage circuit 206 at overcurrent state caused by an unusual load.

Defining the reference voltage of the reference voltage circuit 206 as Vref [V], the resistance value of the current sensing resistance 204 as R [Ω] (at this time, ON resistance of the switch circuit 203 should be smaller enough than R), and current flowing there as I [A], when $$I \geq Vref/R \ [A] \tag{1}$$

output of the comparator 212 turns to "L" from "H" and turns the switch circuit off. Because of that, in an overcurrent state, the switch circuit 203 similarly turns off and stops an energy supply to the load connected to the external terminals −V0 and +V0. Further, in a case that a capacitor 313 is connected to the load as shown in FIG. 3, voltage of the secondary cell 301 falls and becomes overcurrent state because the secondary cell 301 lets current flow in a moment to charge the capacitor 301 if electric charge is not charged to the capacitor 313. To avoid the state, delay time is formed in detecting overcurrent and overcurrent is not detected while electric charge is charged to the capacity. It means that the switch control circuit 302 prevents from overdischarge to the secondary cell 301 and transitional fall of charging ability caused by energy supply to the load connected to the external terminals from the secondary cell 301 by controlling the switch circuit 303 between the secondary cell 301 and the external terminals. When great current is consumed because of unusual load, overcurrent is detected and the switch circuit 303 too turns off to stop discharge.

The prior charge and discharge control circuit has the following defects in detecting overcurrent.

Detecting voltage and delay time of the voltage detecting circuit of overcurrent detecting resistance are set in only one combination depending on current which previously assumed load consumes and time which the current is consumed. There have been a problem that the overcurrent detecting circuit turns the switch circuit off after delay time and the switch circuit breaks because of heat before stopping energy supply to the load when greater load than previously estimated is connected or greater current than previously estimated is consumed.

To solve the above-described problem, an object of the present invention is to provide a charge and discharge control circuit which sets more than two kinds of varying detecting voltage and delay time of overcurrent detecting resistance, detects overcurrent after delay time depending on load current, and stops discharge to stop before the switch circuit breaks because of heat.

SUMMARY OF THE INVENTION

To solve the above problem, the charge and discharge control circuit includes a circuit for detecting more than two kinds of varying voltage at the overcurrent detecting terminal. The circuit has a function to stop discharge after a proper delay time for more than two kinds of varying load current by discharge control receiving signal of said circuit voltage.

The charge and discharge control circuit constructed as above-mentioned stops discharge for load current after proper delay time and operates to prevent the switch circuit to break at overcurrent detecting state caused by current consumed by the load, and continues discharge for the load to improve reliability of whole of instrument and stability of operation at state released from overcurrent detecting state before delay time.

DETAILED DESCRIPTION OF THE INVENTION

Referring figures, an embodiment of the present invention will be described below.

Figure 1:
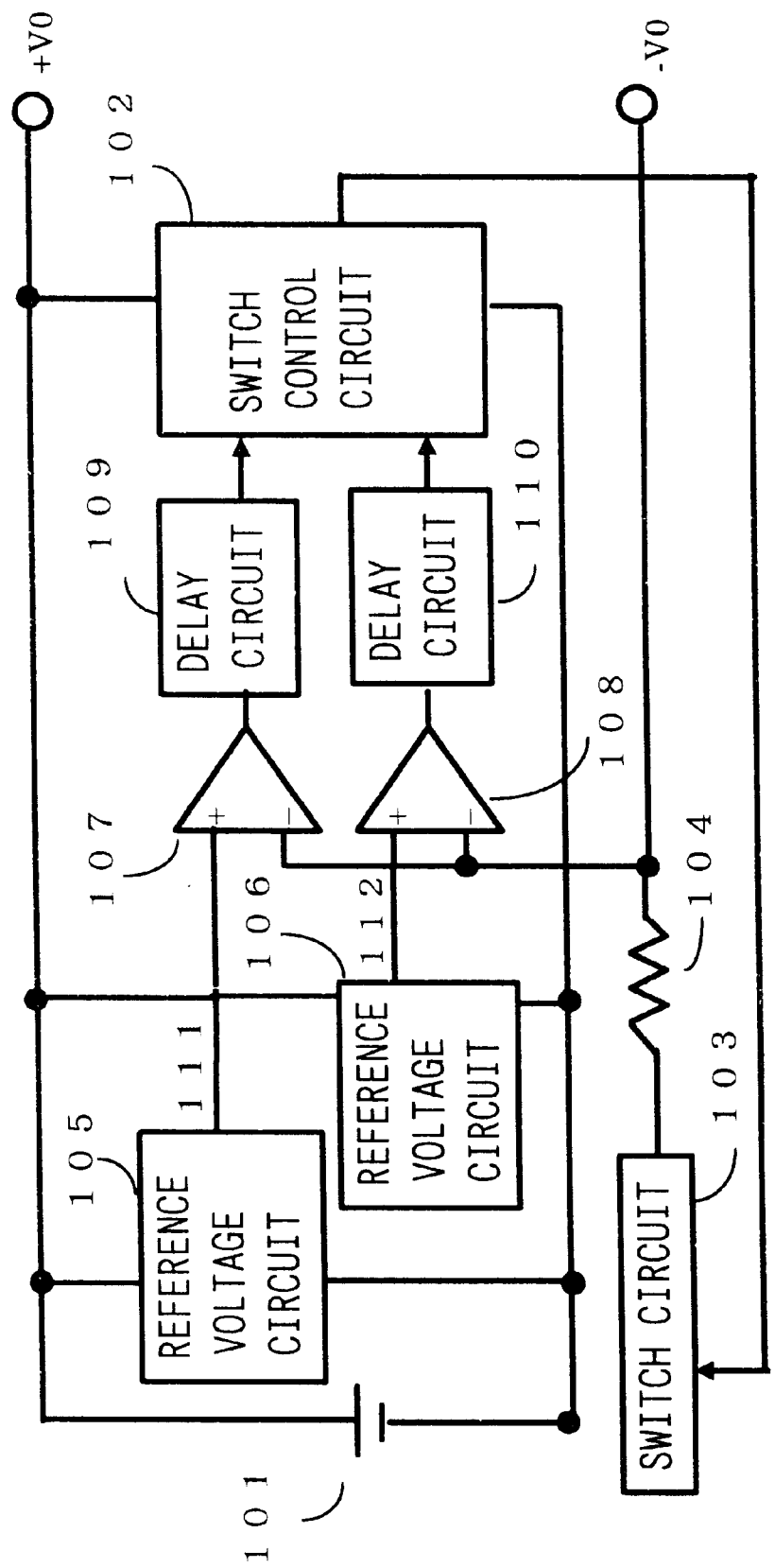
FIG. 1 is a circuit block diagram of a charge and discharge control circuit of the present invention.
Figure 2:
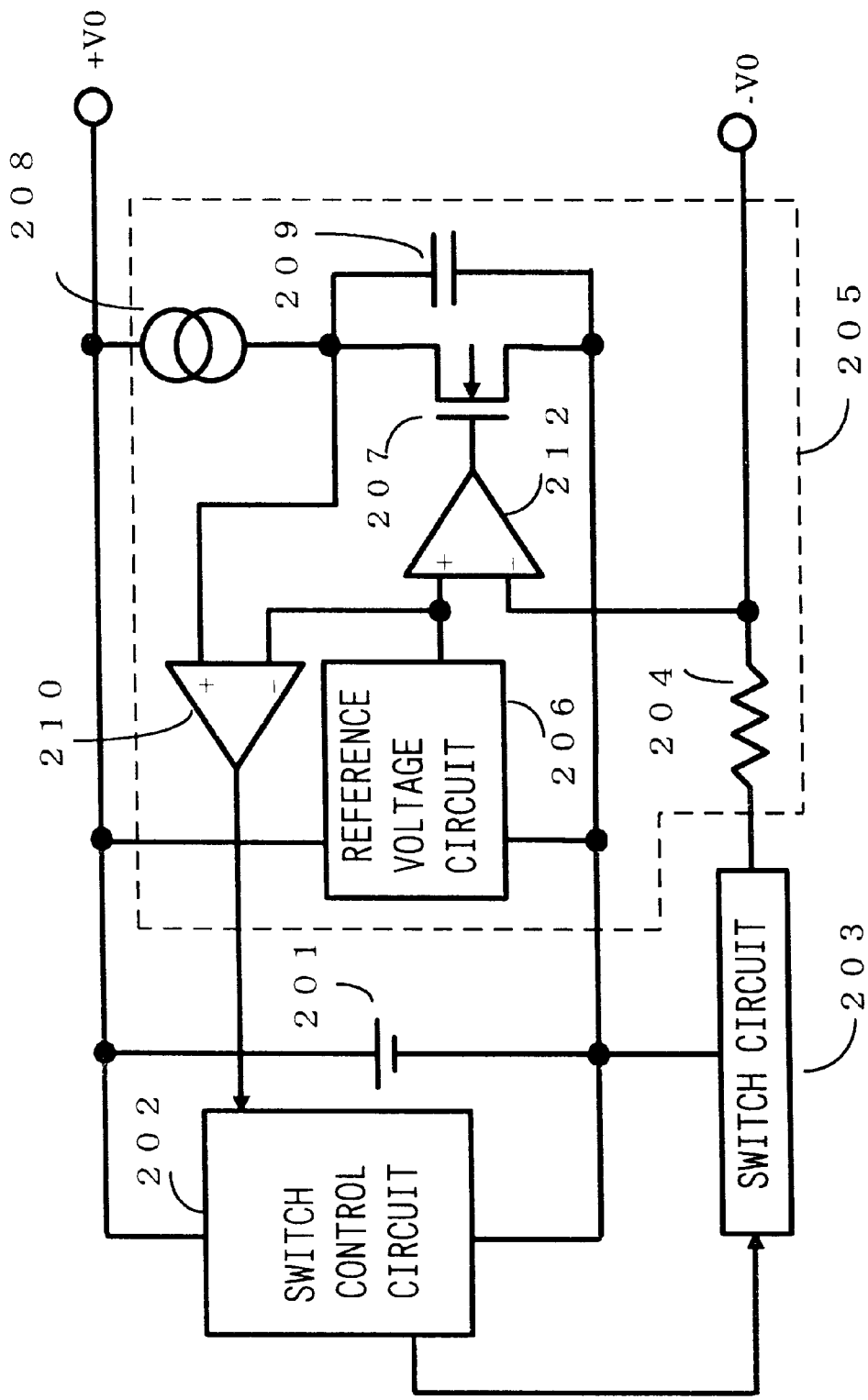
FIG. 2 is a circuit block diagram of the prior charge and discharge control circuit.
Figure 3:
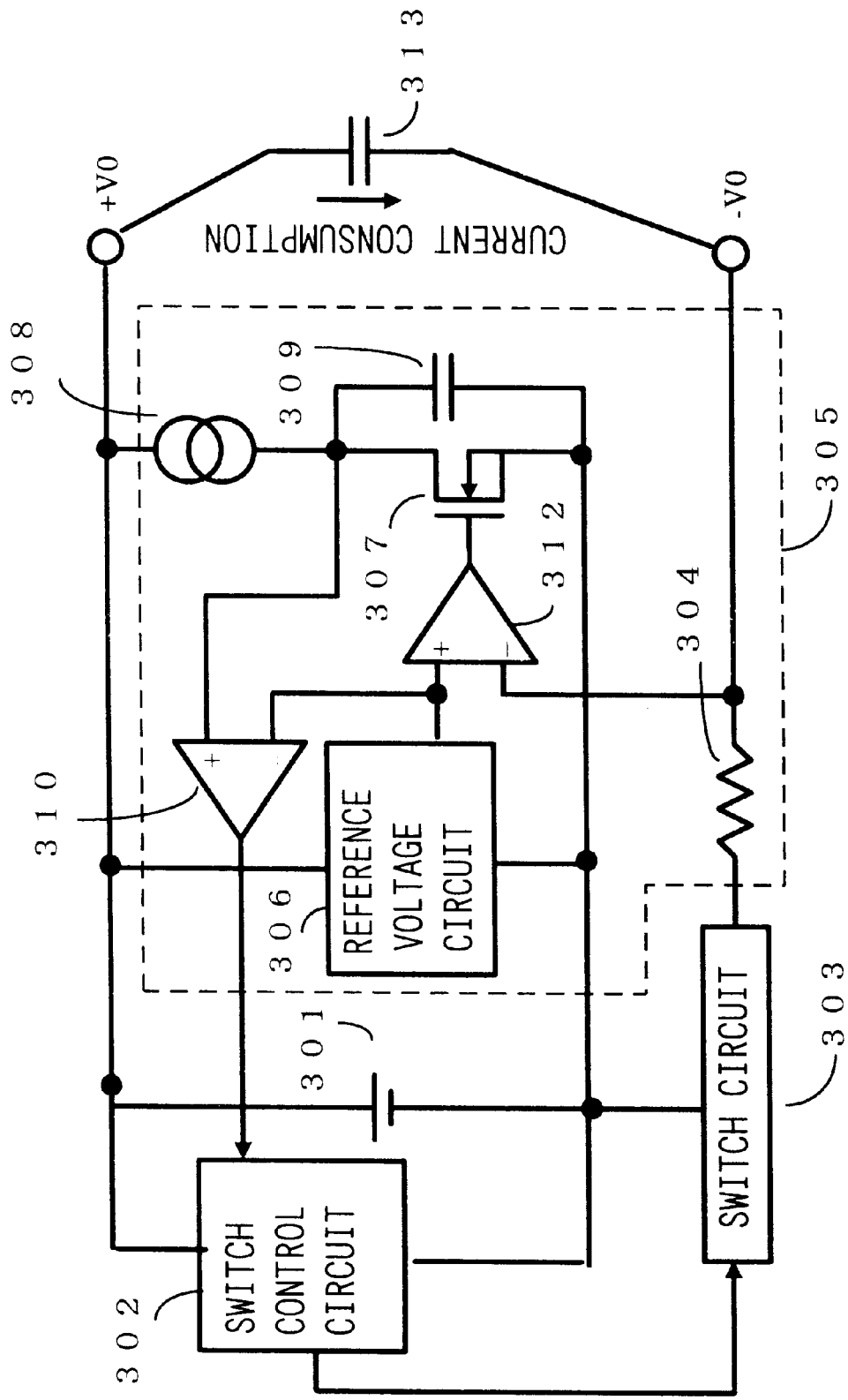
FIG. 3 is a circuit block diagram showing an another example of the prior charge and discharge control circuit.

FIG. 1 is a circuit block diagram of a charge and discharge control circuit of the present invention. A cell 101 as a secondary cell is connected between power source terminals +V0 and −V0 of the charge and discharge control circuit. The external terminal −V0 is connected to the negative pole side of the secondary cell 101 through a current sensing resistor 104 and a switch circuit 103. Further, a switch control circuit 102 and reference voltage circuits 105 and 106 are connected in parallel to the secondary cell 101. The reference voltage circuit 105 outputs reference voltage 111 and is connected to a plus input terminal of a comparator circuit 107. The reference voltage circuit 106 outputs reference voltage 112 and is connected to a plus input terminal of a comparator circuit 108. Output of the comparator circuit 107 is input to a delay circuit 109 and output of the comparator circuit 108 is input to a delay circuit 110. Output of the delay circuits 109 and 110 are input to the switch control circuit 102. Voltage of the secondary cell 101 is detected by a overcurrent detecting circuit and overdischarge detecting circuit inside of the switch control circuit 102 and a signal is output from the switch control circuit 102 so as to turn the switch circuit 103 off in the state of overcharge and overdischarge. For detecting overcurrent, the comparator 107 compares between voltage of the current sensing resistance 104 and reference voltage 111, and the comparator 108 compares between voltage of the current sensing resistance 104 and reference voltage 112. The switch circuit 103 may be constructed by FET devices (Field Effect Transistor) and the like. In this case, the current sensing resistor 104 is not need because the switch circuit itself has a limited resistance value.

Next, an operation will be described.

Reference voltage 111 of the reference voltage circuit 105 supposes to be set higher than reference voltage 112 of the reference voltage circuit 106 and delay time of the delay circuit 109 supposes to be set shorter than delay time of the delay circuit 110. By such setting, when an overcurrent state is kept in which voltage of the current sensing resistor 104 is higher than reference voltage 112 and lower than reference voltage 111, the switch control circuit 102 operates to turn the switch circuit 103 off after delay time previously set at delay circuit 110. Similarly, when overcurrent state is kept in which voltage of the current sensing resistor 104 is higher than reference voltage 111 of the reference voltage circuit 105, the switch control circuit 102 operates to turn the switch circuit 103 off after delay time previously set at delay circuit 109 and before operation time of the delay circuit 110. The delay circuits 109 and 110 may be any kinds of circuits to obtain a constant delay time. Controlling simply a logic signal, the switch control circuit 102 can change its output form depending on the switch circuit 103.

Figure 4:
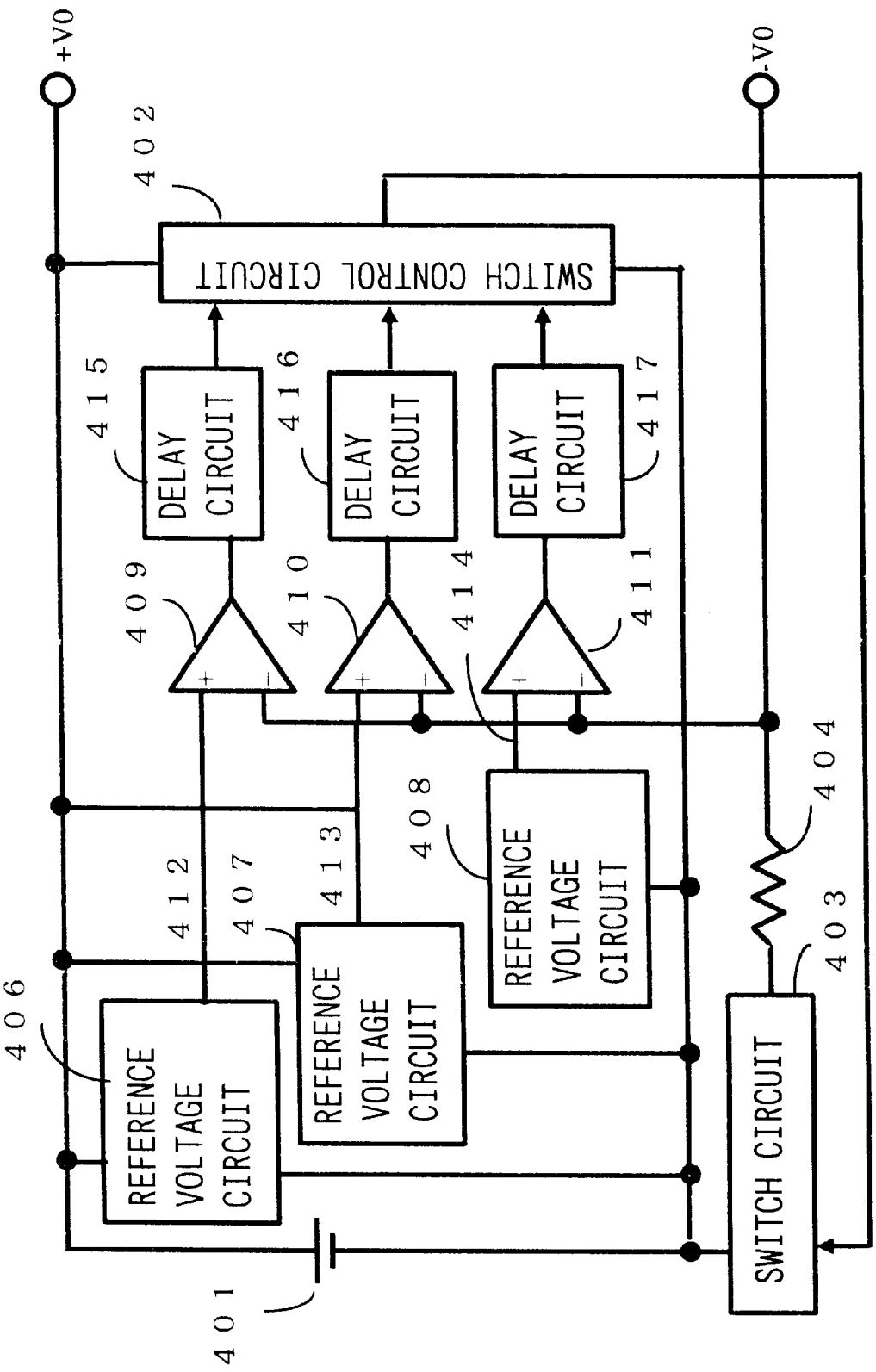
FIG. 4 is a circuit diagram of a charge and discharge control circuit having three groups of a comparator circuit and a delay circuit of the present invention.

In FIG. 4, adding a group of a reference voltage circuit, a comparator circuit, and a delay circuit, three kinds of overcurrent state are detected and a switch control circuit 402 operates to turn a switch circuit 403 off. Reference voltage 412 of the reference voltage circuit 406 supposes to be set higher than reference voltage 413 of the reference voltage circuit 407 and reference voltage 413 of the reference voltage circuit 407 supposes to be set higher than reference voltage 414 of the reference voltage circuit 408. Delay time of the delay circuit 415 supposes to be set shorter than delay time of the delay circuit 416 and delay time of the delay circuit 416 supposes to be set shorter than delay time of the delay circuit 417. By such setting, when overcurrent state is kept in which voltage of the current sensing resistor 404 is higher than reference voltage 414 and lower than reference voltage 413, the switch control circuit 402 operates to turn the switch circuit 403 off after delay time previously set at delay circuit 417. Similarly, when overcurrent state is kept in which voltage of the current sensing resistor 404 is higher than reference voltage 413 and lower than reference voltage 412, the switch control circuit 402 operates to turn the switch circuit 403 off after delay time previously set at delay circuit 416 and before operation time of the delay circuit 417. When state is kept in which voltage of the current sensing resistor 404 is higher than reference voltage 412, the switch control circuit 402 operates to turn the switch circuit 403 off after delay time previously set at delay circuit 415 and before operation time of the delay circuits 416 and 417.

If the number of reference voltage outputs of the reference voltage circuit and delay times of the delay circuit are increased, a plurality of varying voltages of the overcurrent detecting terminals are detected and discharge is stopped by the right delay time for each of a plurality of varying load currents.

Figure 5:
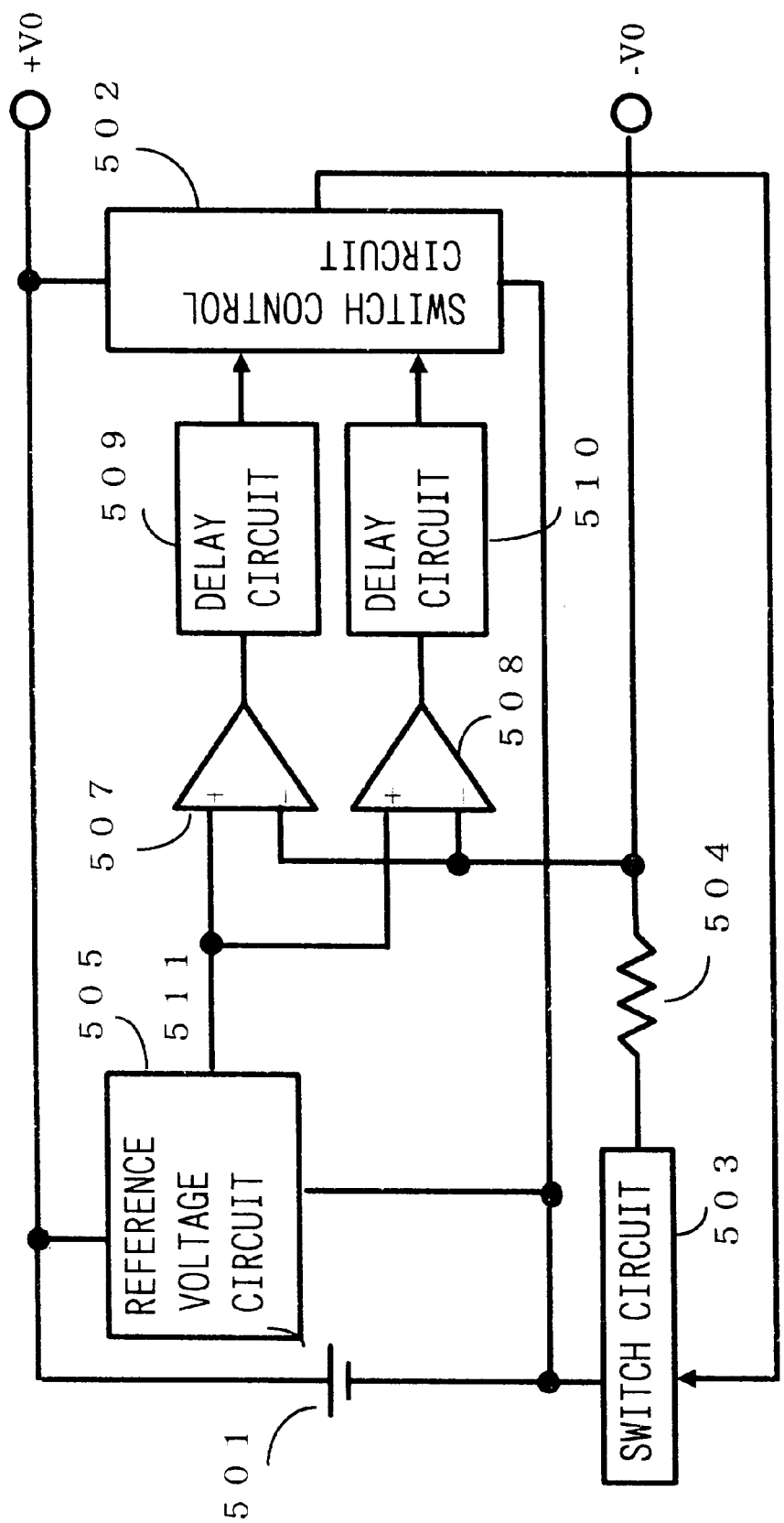
FIG. 5 is a circuit diagram of a charge and discharge control circuit having one reference voltage circuit and two comparator circuits varied in off-set voltage.

FIG. 5 is a circuit block diagram showing an another embodiment of the present invention.

Only one reference voltage circuit 505 is included in a reference voltage circuit of the embodiment. Reference voltage 511 of the reference voltage circuit 505 is connected to each plus input terminal of comparator circuits 507 and 508. One of the comparator circuits 507 and 508 is off-set. The off-set supposes to be set so that the output of the comparator inverts at a higher input voltage of the comparator 507 than the comparator circuit 508. Further, delay time of a delay circuit 509 supposes to be set shorter than delay time of a delay circuit 510. By such setting, when an overcurrent state occurs in which the voltage of the current sensing resistor 504 is higher than the inversion voltage of the comparator circuit 505 and lower than the inversion voltage of the comparator circuit 507, the switch control circuit 502 operates to turn the switch circuit 503 off after delay time previously set at delay circuit 510. Similarly, when an overcurrent state is detected in which voltage of the current sensing resistor 504 is higher than inversion voltage of the comparator circuit 507, the switch control circuit 502 operates to turn the switch circuit 503 off after a delay time previously set at delay circuit 509 and before operation time of the delay circuit 510.

Increasing the number of comparators varying in off-set voltage and delay time of delay circuits, a greater plurality of varying voltage of overcurrent detecting terminal may be detected in a similar manner and discharge stops at a correct delay time for a plurality of varying load current.

Figure 6:
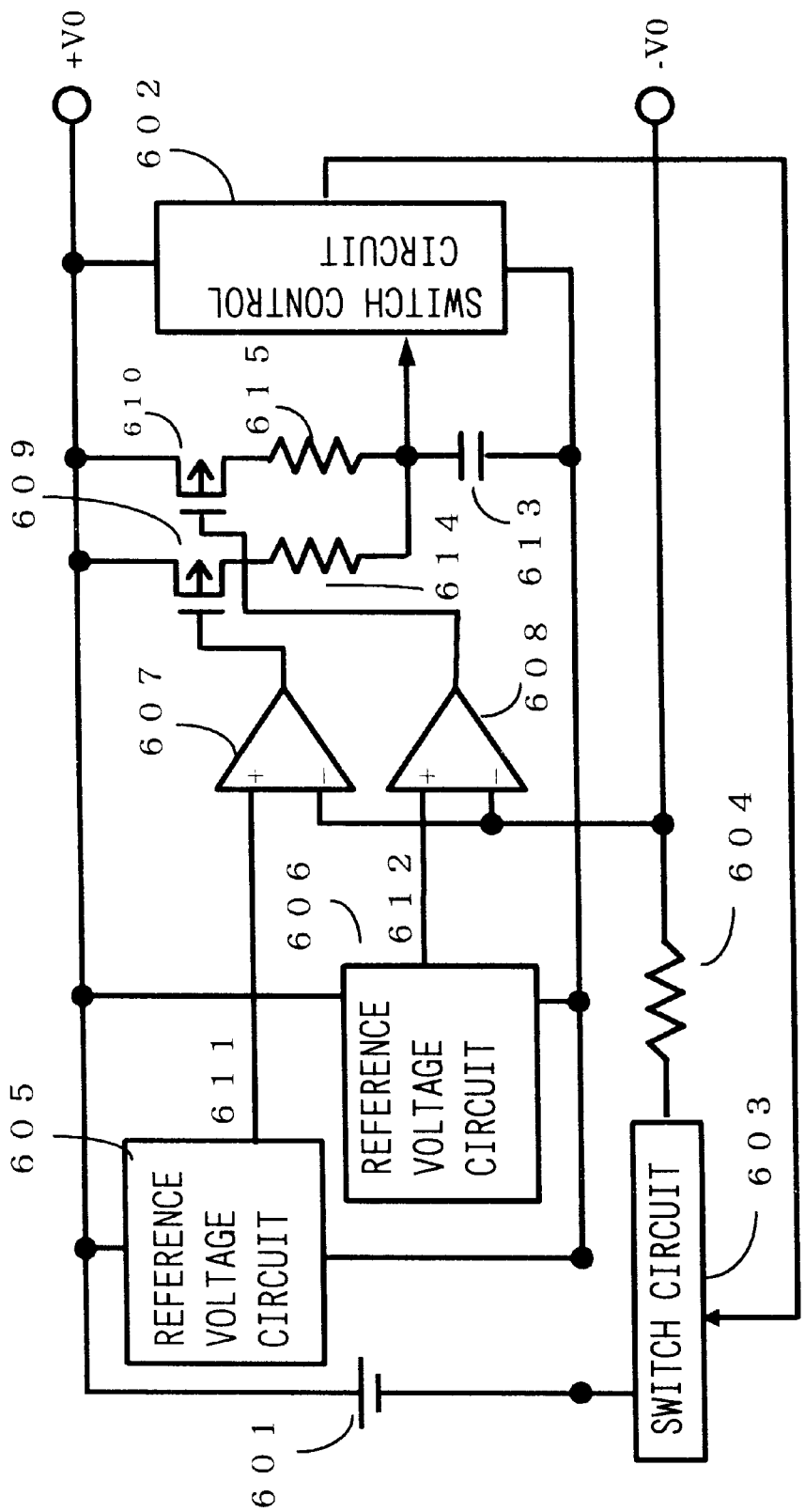
FIG. 6 is a circuit diagram of a charge and discharge control circuit of the present invention having one reference voltage circuit and combination of a resistor and a capacitor.

FIG. 6 is a circuit block diagram showing an embodiment in which two delay circuits of FIG. 1 are replaced with a resistance and a capacitor.

Output of a comparator circuit 607 is input to a gate of P channel FET 609, and output of a comparator circuit 608 is input to a gate of P channel FET 610. A drain of the P channel FET 609 is connected to one end of a resistor 614, and a drain of the P channel FET 610 is connected to one end of a resistor 615. The other end of resistor 614 is connected to the other end of the resistor 615 and to a capacitor 613, and is input to a switch control circuit 602. Reference voltage 611 of a reference voltage circuit 605 supposes to be set higher than reference voltage 612 of a reference voltage circuit 606. By such setting, when overcurrent state is kept in which voltage of the current sensing resistor 604 is higher than reference voltage 612 and lower than reference voltage 611, the P channel FET 610 turns on and the switch control circuit 602 operates to turn the switch circuit 603 off after delay time previously set by a constant of the resistor 615 and the capacitor 613. Similarly, when overcurrent state is kept in which voltage of the current sensing resistor 604 is higher than reference voltage 611 of the reference voltage circuit 605, the switch control circuit 602 operates to turn the switch circuit 603 off after delay time that P channel FETs 609 and 610 turn on, and the time set by a constant of resistance value of the resistors 614 and 615 connected in parallel and the capacitor 613, in another word, after shorter delay time than delay time previously set by a constant of the resistor 615 and the capacitor 613.

Increasing reference voltage output of the reference voltage circuit and numbers of the P channel FET and the resistor, a plurality of varying voltages of overcurrent detecting terminals are detected in a similar manner and discharge stops in a right delay time for a plurality of varying load currents.

Figure 7:
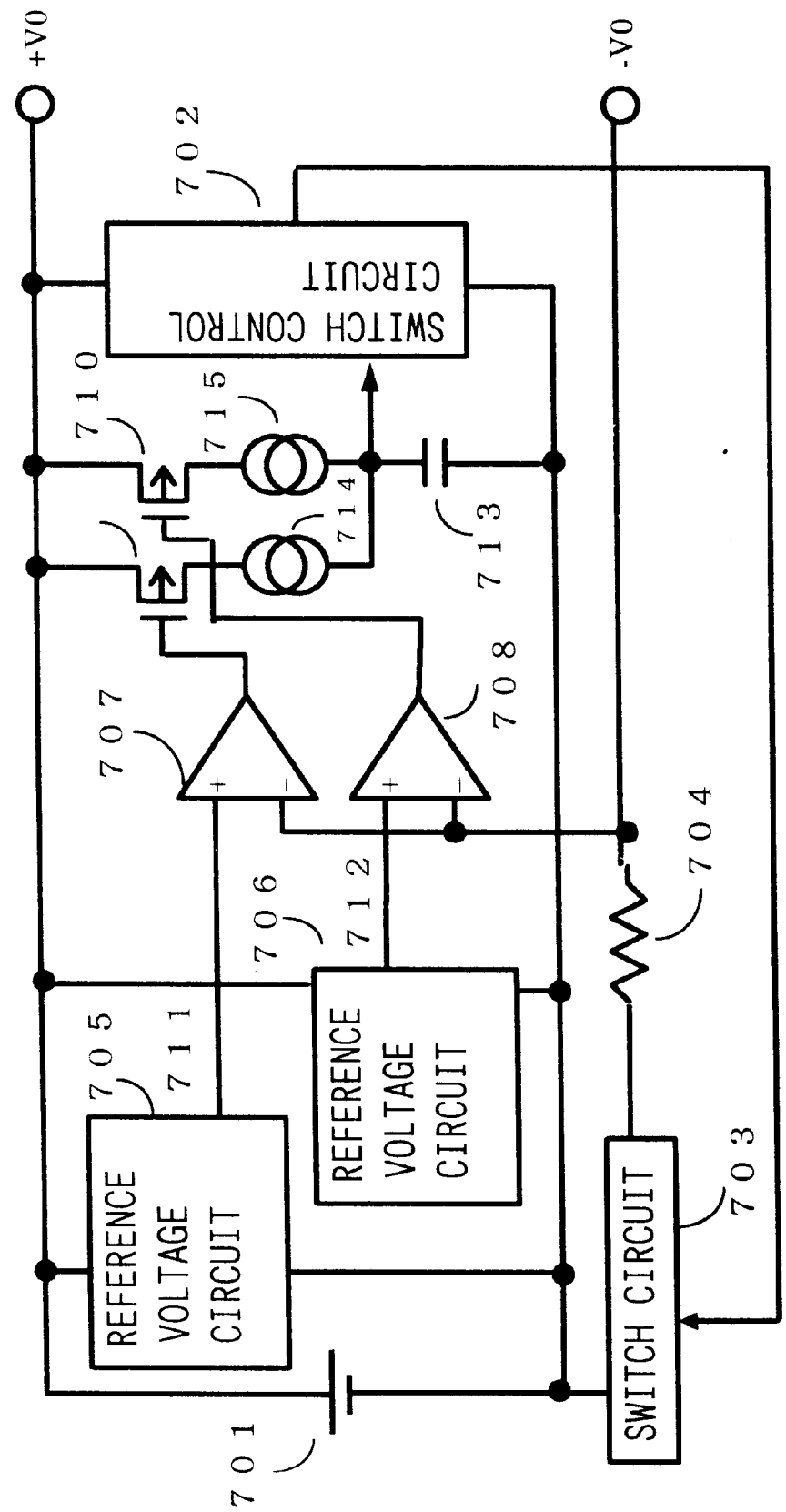
FIG. 7 is a circuit diagram of a charge and discharge control circuit of the present invention having one reference voltage circuit and combination of a constant current source and a capacitor.

FIG. 7 is a circuit diagram showing an embodiment replacing resistors 614 and 615 of FIG. 6 with constant current sources 714 and 710 respectively, which operates similarly as the circuit of FIG. 7. Even in FIG. 7, increasing reference voltage output of the reference voltage circuit and numbers of the P channel FET and the constant current source, a plurality of varying voltages of overcurrent detecting terminals are detected in a similar manner and discharge stops in a right delay time for a plurality of varying load currents.

Numeral 701 shows a secondary cell and Numeral 702 shows a switch control circuit.

Numeral 703 shows a switch circuit and numeral 704 shows a current sensing resistor.

Numerals 705 and 706 shows a reference voltage circuit, respectively.

Numerals 707 and 708 shows a comparator circuit, respectively.

Numeral 711 shows a reference voltage of the reference voltage circuit 705 and Numeral 712 shows a reference voltage of the reference voltage circuit 706.

Numerarus 709 and 710 shows a P channel FET, respectively.

Numerals 714 and 715 shows a constant current source, respectively.

Numeral 713 shows a capacitor.

Figure 8:
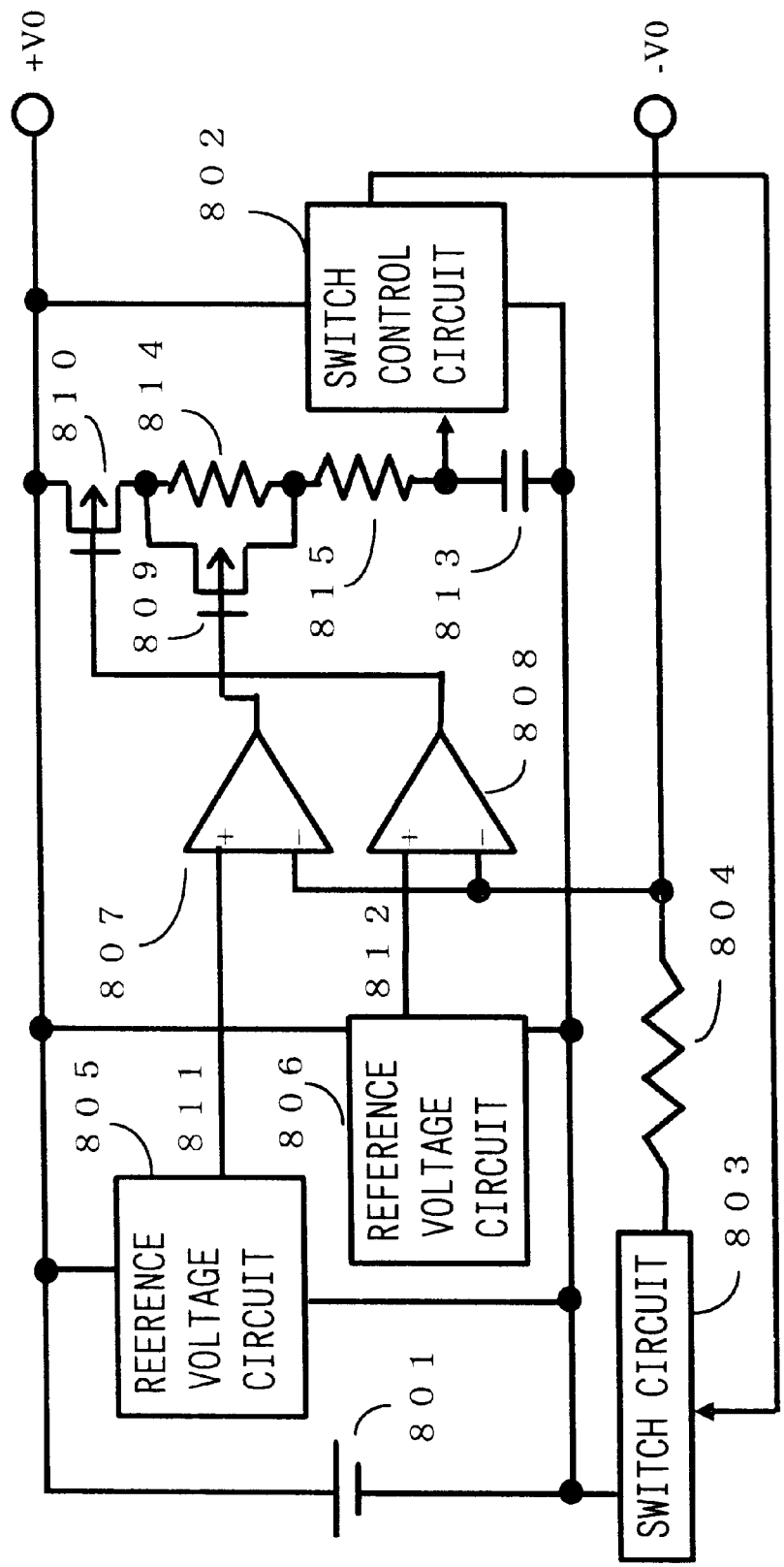
FIG. 8 is a circuit diagram of an another charge and discharge control circuit of the present invention having one reference voltage circuit and combination of a resistor and a capacitor.

FIG. 8 is a circuit diagram showing an another embodiment in which two delay circuits of FIG. 1 is put together with a resistor and a capacitor. Output of a comparator circuit 807 is input to a gate of P channel FET 809, and output of a comparator circuit 808 is input to a gate of P channel FET 810. A drain of the P channel FET 810 is connected to one end of a resistor 814 and a source of the P channel FET 809. A drain of the P channel FET 809 is connected to the other end of the resistor 814 and one end of a resistor 815. The other end of resistor 815 is connected to a capacitor 813, and is input to a switch control circuit 802. Reference voltage 811 of a reference voltage circuit 805 supposes to be set higher than reference voltage 812 of a reference voltage circuit 806. By such the setting, when overcurrent state is kept in which voltage of the current sensing resistor 804 is higher than reference voltage 812 and lower than reference voltage 811, the P channel FET 810 turns on and the switch control circuit 802 operates to turn the switch circuit 803 off after delay time set by constant of the series resistance value of the resistors 814 and 815, and the capacitor 813. Similarly, when overcurrent state is kept in which voltage of the current sensing resistor 804 is higher than reference voltage 811 of the reference voltage circuit 805, the switch control circuit 802 operates to turn the switch circuit 803 off after delay time that P channel FETs 809 and 810 turn on, and the time set by a constant of resistance value of resistors 814 and 815 connected in series and the capacitor 813, in another word, after shorter delay time than delay time set by a constant of series resistance value of the resistors 814 and 815, and the capacitor 813.

Increasing reference voltage output of the reference voltage circuit and numbers of the P channel FET and the resistor, a plurality of varying voltages of overcurrent detecting terminals are detected in a similar manner and discharge stops in a right delay time for a plurality of varying load currents.

Figure 9:
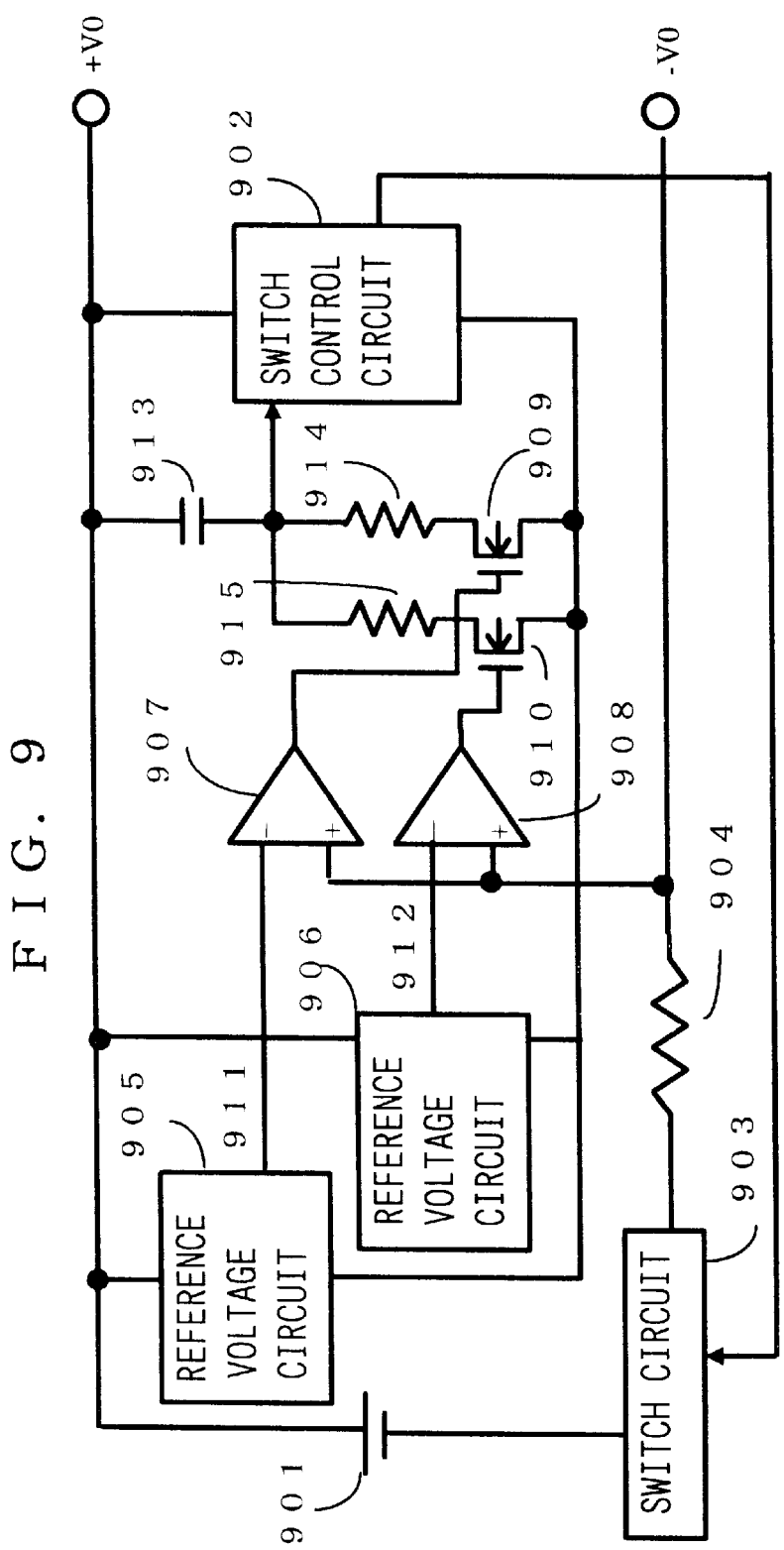
FIG. 9 is a circuit diagram of an further another charge and discharge control circuit of the present invention having one reference voltage circuit and combination of a resistor and a capacitor.

FIG. 9 is a circuit diagram showing an embodiment in which each place of the resistor and the capacitor of FIG. 6 is reversed. A reference voltage circuit 905 outputs reference voltage 911, and is connected to a minus input terminal of a comparator circuit 907. A reference voltage circuit 906 outputs reference voltage 912, and is connected to a minus input terminal of a comparator circuit 908. Output of a comparator circuit 907 is input to a gate of N channel FET 909, and output of a comparator circuit 908 is input to a gate of N channel FET 910. A drain of the N channel FET 909 is connected to one end of a resistor 914, and a drain of N channel FET 910 is connected to one end of a resistor 915. The other end of resistor 914 is connected to the other end of the resistor 915 and a capacitor 913, and is input to a switch control circuit 902. Reference voltage 911 of a reference voltage circuit 905 supposes to be set higher than reference voltage 912 of a reference voltage circuit 906. By such the setting, when overcurrent state is kept in which voltage of the current sensing resistor 904 is higher than reference voltage 912 and lower than reference voltage 911, the N channel FET 910 turns on and the switch control circuit 902 operates to turn the switch circuit 903 off after delay time set by constant of the resistors 915 and the capacitor 913. Similarly, when overcurrent state is kept in which voltage of the current sensing resistor 904 is higher than reference voltage 911 of the reference voltage circuit 905, the switch control circuit 902 operates to turn the switch circuit 903 off after delay time that N channel FETs 909 and 910 turn on, and the time set by a constant of resistance value of resistors 814 and 815 connected in parallel and the capacitor 913, in another word, after shorter delay time than delay time set by a constant of resistors 915 and the capacitor 913.

Increasing reference voltage output of the reference voltage circuit and numbers of the N channel FET and the resistor, a plurality of varying voltages of overcurrent detecting terminals are detected in a similar manner and discharge stops in a right delay time for a plurality of varying load currents.

If the resistor is replaced with a constant current source, the circuit operates similarly.

Figure 10:
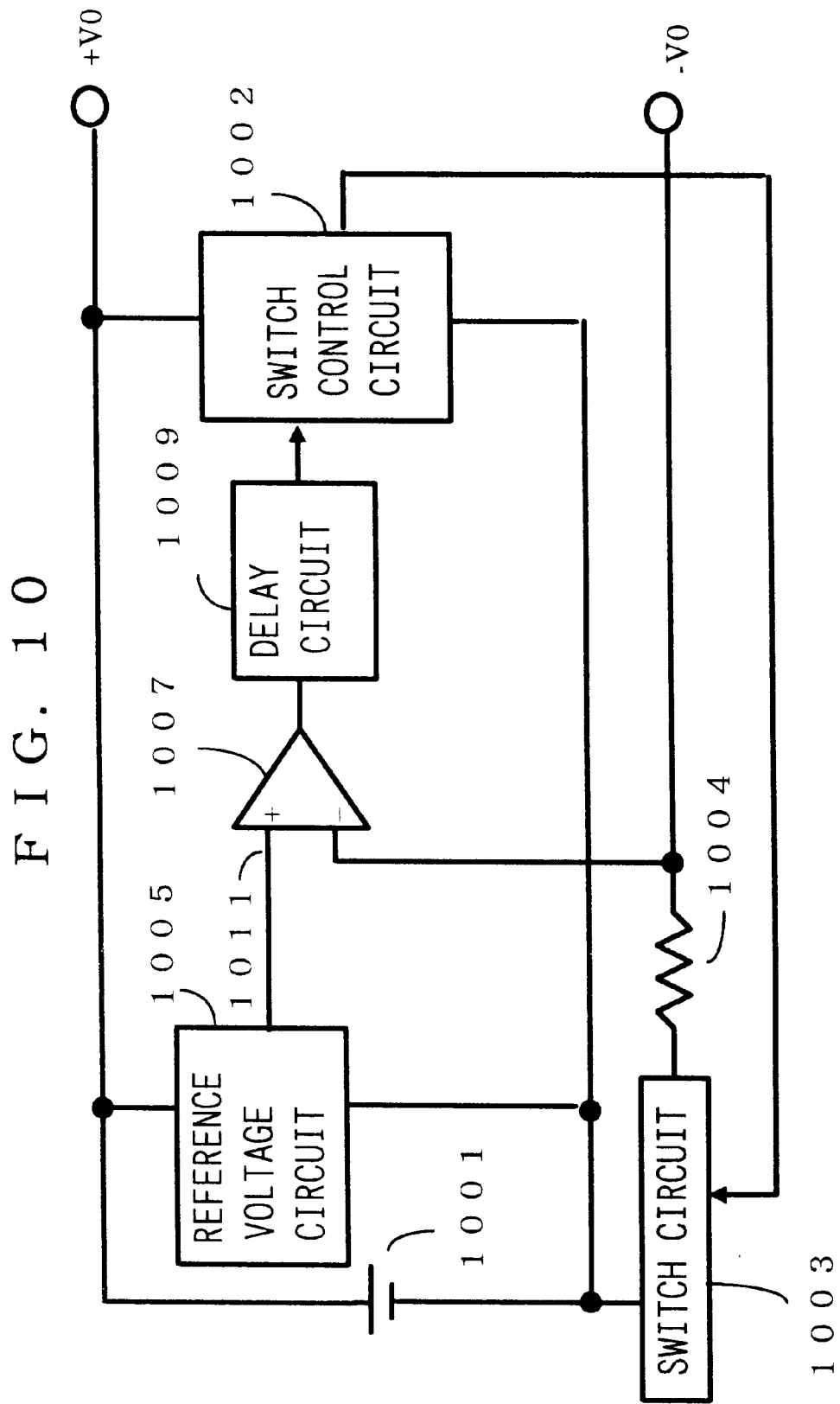
FIG. 10 is a circuit diagram of a charge and discharge control circuit of the present invention having one reference voltage circuit, one comparator circuit, and one delay circuit and temperature characteristics in delay time of the delay circuit.

FIG. 10 is a circuit diagram showing a circuit having temperature characteristics in a delay circuit, which includes a reference voltage circuit, a comparator circuit, and a delay circuit, though the circuit of FIG. 1 has two of each circuit. A delay circuit 1009 supposes to be set delay time long at low temperature and short at high temperature, and to be formed at the position affected by heat of a switch circuit. By such the setting, when overcurrent state is kept in which voltage of the current sensing resistor 1004 is higher than reference voltage 1011 from a reference voltage circuit 1005, the switch control circuit 1002 operates to turn the switch circuit 1003 off after delay time previously set at the delay circuit 1009. When the switch circuit 1003 has heat before said delay time caused by great overcurrent value, delay time of the delay circuit 1009 becomes short and turns the switch circuit 1003 off before the switch circuit 1003 breaks.

Numeral 1001 shows a secondary cell and Numeral 1007 shows a comparator circuit.

The present invention, as above-described, has a circuit stopping discharge after delay time corresponding with current consumed at the load. Therefore, if overcurrent flows because of unusual load (for example, short-circuit) and current which is more than overcurrent estimated before is consumed, the charging power source device operates to turn the switch circuit off in shorter delay time before the switch circuit breaks because of heat. Because of this, the product is used for wide range and reliability is improved.

What is claimed is:

1. A charge and discharge control circuit comprising: a pair of external connection terminals connected when in use to a power source; a switch circuit connected between the power source and at least one of the external connection terminals; an overcurrent detection element connected in series with the power source for producing an output voltage in accordance with a current flowing therethrough; a voltage detecting circuit for determining whether the output voltage of the overcurrent detection element is above any of a plurality of overcurrent detection voltage levels and outputting an overcurrent detection signal for controlling the switch circuit to disconnect the power source from the external connection terminal; and a delay circuit for delaying the overcurrent detection signal by a variable delay time having a value which varies depending upon the level of the output voltage of the overcurrent detection element.

2. A charge and discharge control circuit according to claim 1; wherein the voltage detecting circuit comprises a plurality of reference voltage generating circuits and a plurality of comparator circuits, each reference voltage generating circuit generating a different reference voltage value.

3. A charge and discharge control circuit according to claim 1; wherein the voltage detecting circuit comprises a reference voltage circuit and a plurality of comparator circuits, an offset value of each comparator circuit being different from that of the other comparator circuits.

4. A charge and discharge control circuit according to claim 1; wherein the delay circuit comprises a plurality of constant current sources and a capacitor.

5. A charge and discharge control circuit according to claim 1; wherein the delay time of the delay circuit varies depending on temperature.

6. A charge and discharge control circuit according to claim 1; wherein the power source comprises a secondary cell.

7. A charge and discharge control circuit according to claim 1; wherein the switch circuit comprises a FET transistor circuit.

8. A charge and discharge control circuit according to claim 1; wherein the overcurrent detection element comprises a resistor connected in series with the power source.

9. A charge and discharge control circuit according to claim 1; wherein the voltage detecting circuit comprises a plurality of reference voltage generating circuits each for generating a reference voltage corresponding to a different overcurrent detection level, and a plurality of comparator circuits each for comparing the output voltage of the overcurrent detection element with a respective reference voltage and outputting an overcurrent detection signal when the output voltage of the overcurrent detection element exceeds a respective reference voltage level.

10. A charge and discharge control circuit according to claim 9; wherein the delay circuit comprises a plurality of delay circuits each for delaying the overcurrent detection signal of a respective comparator circuit by a different delay time so that the delay time differs for each of the detected overcurrent levels.

11. A charge and discharge control circuit comprising: a secondary cell; external connection terminals connected to the secondary cell and being connectable to a load for supplying power to the load and to a charging device for charging the secondary cell; a switch circuit connected in series between the secondary cell and at least one of the external connection terminals; an overcurrent detection circuit connected with the secondary cell for outputting an overcurrent detection signal for controlling the switch circuit to disconnect the secondary cell from the external connection terminals when the current through the secondary cell is above one of a plurality of values; and a delay circuit for delaying the overcurrent detection signal by a variable delay time having a value which varies in accordance with the level of current through the secondary cell.

12. A charge and discharge control circuit according to claim 11; wherein the overcurrent detection circuit comprises an overcurrent detection element connected in series with the secondary cell for producing an output voltage in accordance with the current flowing therethrough, and a voltage detection circuit for detecting the output voltage of the overcurrent detection element and outputting an overcurrent detection signal when the output voltage is above any one of a plurality of voltage levels.

13. A charge and discharge control circuit according to claim 12; wherein the voltage detection circuit comprises a plurality of reference voltage generators each for generating a reference voltage, and a plurality of comparator circuits each for comparing the output voltage of the overcurrent detecting element with a respective reference voltage and generating an overcurrent detection signal when the output voltage of the overcurrent detection element is greater than the respective reference voltage.

14. A charge and discharge control circuit according to claim 13; wherein the delay circuit comprises a plurality of delay circuits each for delaying the overcurrent detection signal generated by a respective one of the comparator circuits by a different delay time.

15. A charge and discharge control circuit according to claim 12; wherein the voltage detecting circuit comprises a reference voltage circuit and a plurality of comparator circuits, an offset value of each comparator circuit being different from that of the other comparator circuits.

16. A charge and discharge control circuit according to claim 11; wherein the delay circuit comprises a plurality of constant current sources and a capacitor.

17. A charge and discharge control circuit according to claim 11; wherein the delay time of the delay circuit varies depending on temperature.

* * * * *